Jan. 30, 1968

H. BLAZEK ET AL 3,365,942

INERTIAL ALTIMETER

Filed April 3, 1964

INVENTORS
HENRY BLAZEK
JAMES A. XENAKIS
NAI-CHONG CHANG
ARTHUR WERMUND

BY Raymond R. Skolnick

Jan. 30, 1968  H. BLAZEK ET AL  3,365,942
INERTIAL ALTIMETER

Filed April 3, 1964  4 Sheets-Sheet 2

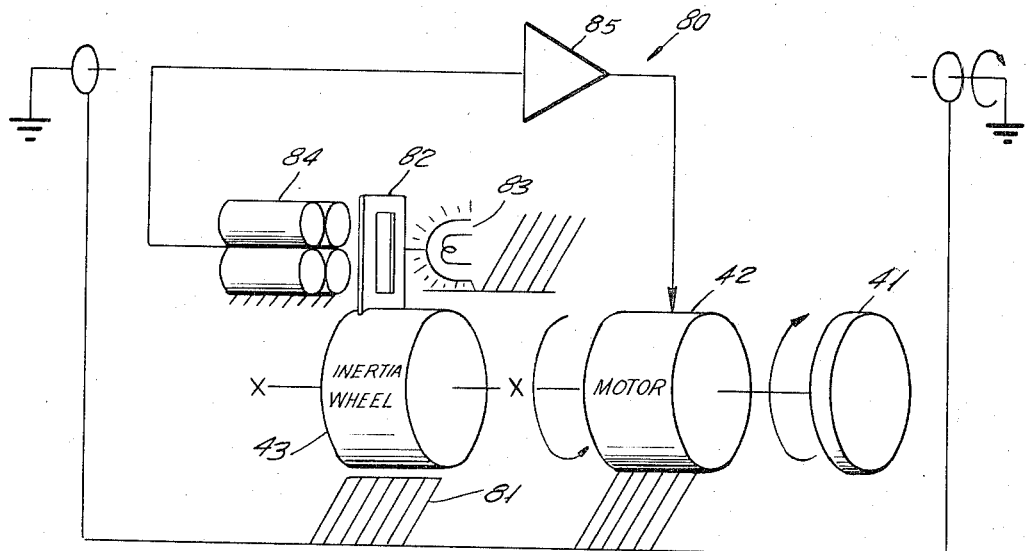

FIG. 4.

1-INIATION
2-SPHERICAL GAS BEARING PRESSURIZED
3-THERMAL BATTERY ACTIVATED
4-SPHERE UNCAGED
5-VERTICAL ALIGNMENT INITIATED
6-SPHERE SPIN-UP
7-INTERNAL GAS SUPPLY ACTIVATED
8-ALL SENSORS UNCAGED
9-UNBALANCE MASS RETRACTED
10-SYSTEM OPERATIONAL

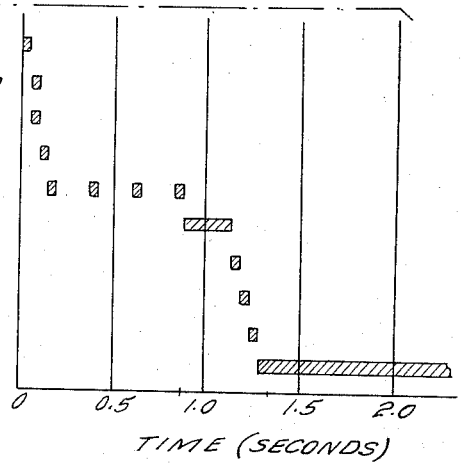

FIG. 7.

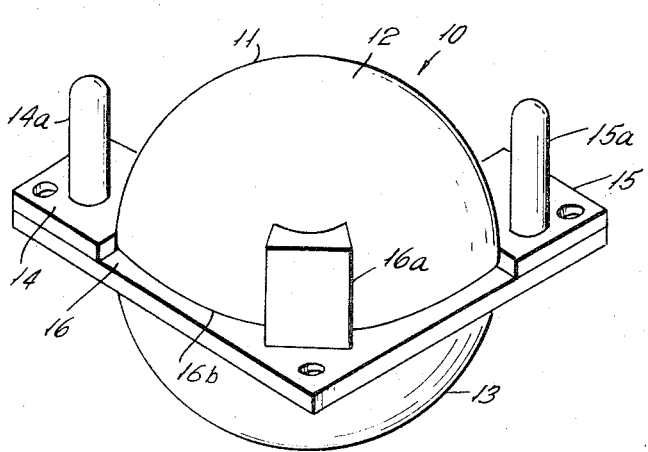

FIG. 2.

INVENTORS
HENRY BLAZEK
JAMES A. XENAKIS
BY  NAI-CHONG CHANG
ARTHUR WERMUND

Raymond R. Skolnick

INVENTORS
HENRY BLAZEK
JAMES A. XENAKIS
NAI-CHONG CHANG
ARTHUR WERMUND
BY Raymond R. Skolnick

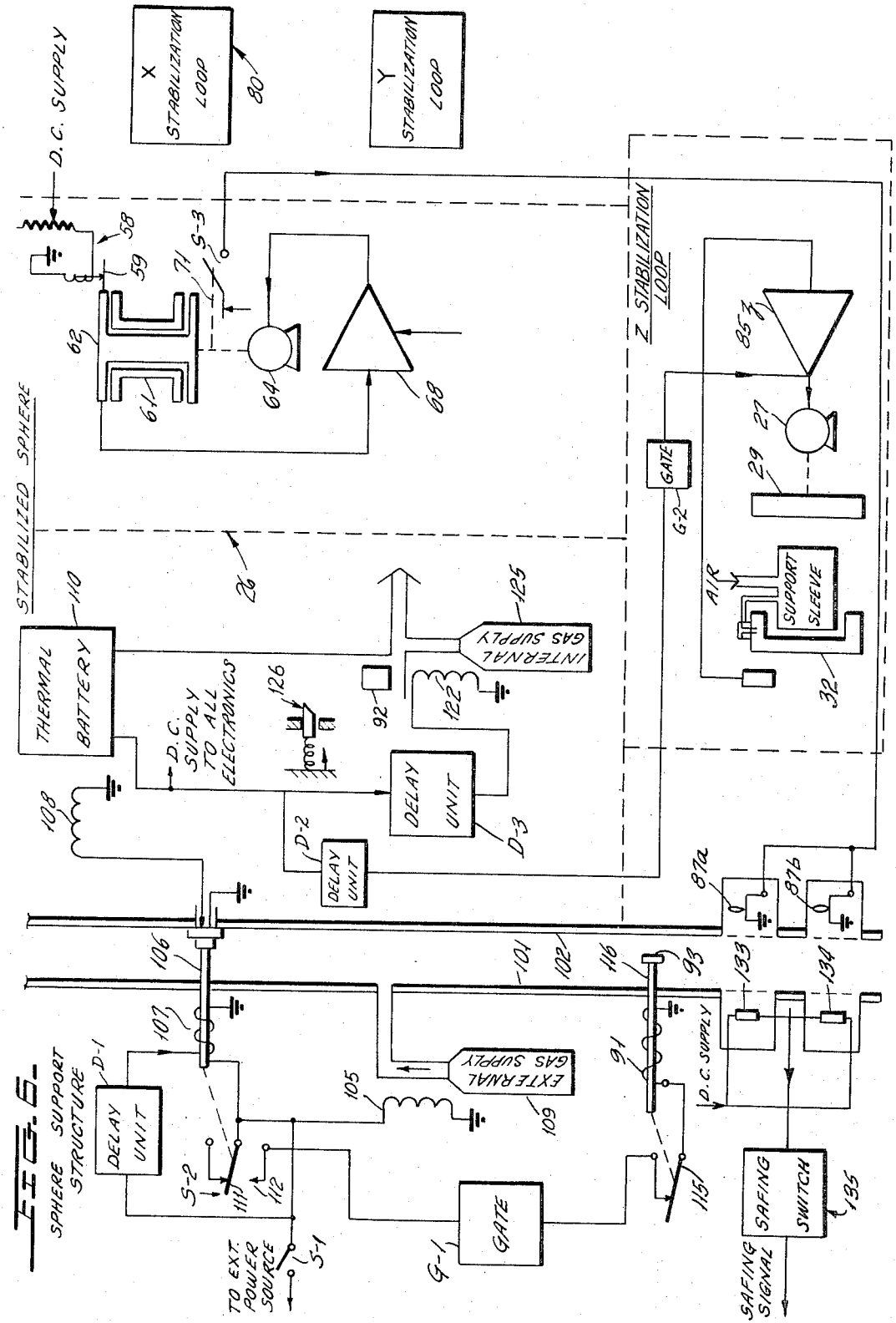

United States Patent Office 3,365,942
Patented Jan. 30, 1968

3,365,942
INERTIAL ALTIMETER
Henry Blazek, Nyack, James A. Xenakis, Woodside, Nai-Chong Chang, New Rochelle, and Arthur Wermund, New York, N.Y., assignors to Sperry Rand Corporation, Ford Instrument Company Division, Long Island City, N.Y., a corporation of Delaware
Filed Apr. 3, 1964, Ser. No. 357,114
11 Claims. (Cl. 73—178)

This invention relates to altimeters in general and, more particularly, relates to a novel altimeter whose output is derived from the forces acting upon an inertial mass.

It is contemplated that the inertial altimeter constituting the instant invention will find extensive application in the safing control of surface to air missiles. Traditionally, altimeters for such application are required to be independent of the missile guidance system so that inaccuracies or failure of the guidance system would not result in a premature arming of the missile.

Heretofore, this safing or arming information was, for the most part, obtained by utilizing an instrument having its own stable platform with gimbals and an inertial sensor aligned along its vertical axis or else a strap-down inertial system was provided to detect the acceleration along the missile frame with the acceleration information being resolved along the vertical axis to obtain height information. The strap-down type required extensive computing apparatus while the gimbals of the former type were not reliable from a mechanical standpoint especially under high acceleration forces.

As will be hereinafter explained in detail, the altimeter of the instant invention includes a floated sphere stabilized along the vertical with attitude stabilization being achieved by utilizing single-axis non-gyroscopic reaction type closed loop torquer systems. Height information is obtained from a double integrating accelerometer whose measuring axis is aligned with the vertical.

The mathematical model of the altimeter is based upon erecting and stabilizing the accelerometer measuring axis along the local vertical. The equation for altitude is then:

$$h = \int_0^t \int (\bar{f}_m - \bar{g}) \cdot \hat{R} d\tau^2$$

where $h$ = altitude $\bar{f}_m$ = vector force per unit mass sensed by inertial accelerometer $\bar{g}$ = gravitation vector $\hat{R}$ = unit vector along the local vertical.

This equation indicates that altitude can be measured by doubly integrating the output of an accelerometer which has been compensated for gravitation. Assuming a flat earth approximation and neglecting the small variation in gravitation with altitude, $\bar{g}$ and $\hat{R}$ are constants, and the accelerometer measuring axis is required to be stable in inertial space. If the horizontal distance traveled by the missile is very large, reliance upon the flat earth approximation leads to certain errors. However, compensation may be built into the altimeter so that there is a corrected output accurately conforming to a spherical earth approximation.

Although the device of the instant inveniton follows in some respects the operation of the prior art stable platform constructions, the device of the instant invention is a more reliable unit in that the entire sphere assembly and each of the sensing elements carried thereby are floated by air bearing means thereby eliminating the necessity for gimbaling so that the unit is capable of withstanding exceptionally high shocks and acceleration forces so prevalent in the operation of surface to air missiles. Further, the utilization of the double integrating accelerometer eliminates the requirement for separate and extensive computer apparatus required of strap down constructions.

Accordingly, a primary object of this invention is to provide a novel construction for an inertial altimeter.

Another object is to provide a novel altimeter including a sphere supported by air bearings means and a plurality of sensors carried by the sphere and supported by individual air bearing means.

Still another object is to provide an inertial altimeter having novel means which corrects for drift of the attitude stabilizers.

A further object is to provide an inertial altimeter having novel means for erecting the accelerometer measuring axis to coincide with the local vertical.

A still further object of this invention is to provide an inertial altimeter including novel means for reducing the time required for aligning the measuring axis with the local vertical.

Another object is to provide an inertial altimeter in which there is a novel fail-safe photoelectric means to provide an unsafing signal when the missile is not within a predetermined altitude range.

Still another object of this invention is to provide a novel altimeter including a sphere supported by air bearing means having means for torquing the sphere without making physical contact with any member outside the sphere.

A further object of this invention is to provide an inertial altimeter including a sphere supported by air bearing means having novel means for sensing and nulling parasitic torques acting on the sphere.

A still further object is to provide an inertial altimeter which may be completely checked out prior to use thereof.

These as well as further objects of this invention shall become readily apparent after reading the following description of the accompanying drawings in which:

FIGURE 2 is a perspective of the altitude sensor of FIGURE 1.

FIGURE 4 is a functional schematic of a rotating double integrating accelerometer.

FIGURE 6 is a block diagram of the altitude sensor of FIGURE 1.

FIGURE 7 is a functional diagram illustrating the sequence of events during the uncaging and aligning process for the floated sphere.

Figure 1:
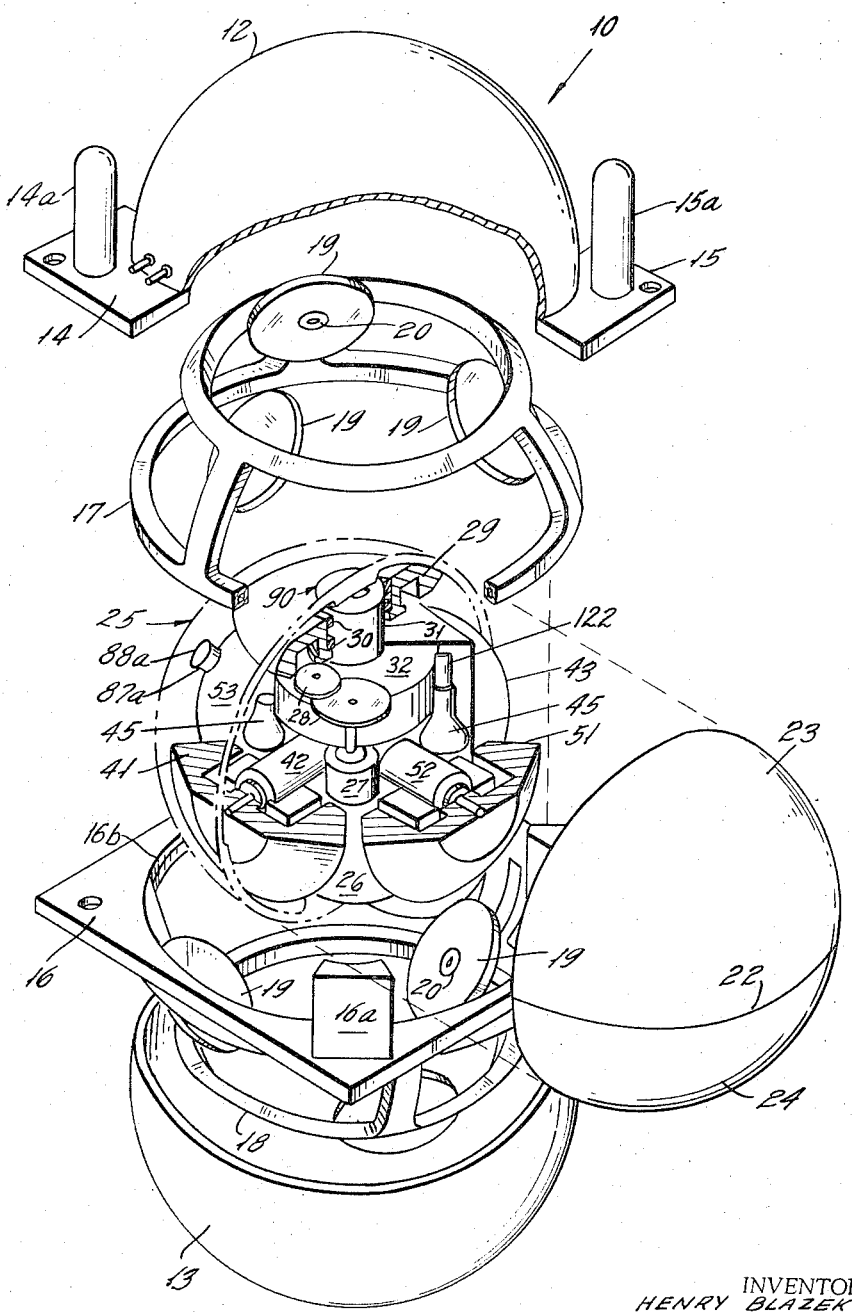
FIGURE 1 is an exploded perspective, partially sectionalized, of an altitude sensor constructed in accordance with the teachings of the instant invention.

Now referring to the figures and more particularly to FIGURES 1 and 2.

Inertial altimeter 10 is provided with a frame including spherical housing 11 formed by hemispheres 12 and 13. Upper hemisphere 12 is provided with outwardly extending ears 14, 15 positioned at the dividing line between hemispheres 12 and 13 while lower hemisphere 13 is secured to plate 16 having circular opening 16b. The securement of ears 14, 15 to plate 16 joins hemispheres 12 and 13 to form spherical housing 11. Plate 16 is secured to the frame of the missile or the like for mounting inertial altimeter 10 in operating position. External gas tanks 14a, 15a for external gas supply 109 in FIGURE 6 extend upwardly from ears 14, 15 respectively while controls housing 16a extends upwardly from plate 16. The functions of tanks 14a, 15a and housing 16a will hereinafter become evident especially in connection with the description of FIGURE 6.

Fixedly mounted upper frame 17 is mounted within hemisphere 12 while lower frame 18 is fixedly mounted within hemisphere 13. Each of the frames 17, 18 is constructed of tubular members and carries a plurality of gas bearing means pads 19. Each pad 19 is provided with a spherical surface having an aperture 20 communicating with the interior of the tubular members constituting frames 17, 18 with these tubular members constituting conduits for directing gas under pressure from supplies 109, 125 (FIGURE 6) to pads 19. The space within the area bounded by the spherical surfaces of pads is occupied by floated sphere assembly 25. Assembly 25 is provided with a shell formed by joining hemispheres 23, 24 along line 22.

The other working elements of altimeter 10 are disposed within sphere 23, 24. These elements include rotating helix double integrating accelerometer 26 which, as will be hereinafter explained, is fixed in position with its measuring axis along the Z or measuring axis of sphere 23, 24. Also mounted along the Z axis or in close proximity thereto is Z servo motor 27 connected through suitable gearing elements 28 to drive Z reaction wheel 29 about the Z axis. Reaction wheel 29 is mounted for rotation on bearings 30 carried by the housing 31 of vertical aligning means 90, also positioned along the Z axis. In addition Z attitude sensing inertia wheel 32 is mounted along the Z axis.

Sphere assembly 25 is also provided with X and Y axes perpendicular to each other and as well as perpendicular to the Z axis. Mounted along the X axis are X reaction wheel 41, X servo motor 42 and attitude sensing inertia wheel 43. Mounted along the Y axis are Y reaction wheel 51, Y servo motor 52 and Y attitude sensing inertia wheel 53. Safing lamp 87a, fixed within sphere 23, 24 and Y inertia wheel 53 are viewable in FIGURE 1 as are tanks 45 for internal gas supply 125 shown in FIGURE 6 and internal gas supply squib 122. This and other squibs are represented in the FIGURE 6 diagram by their firing coils. The bearings and other stationary elements within sphere 23, 24 are positioned by aluminum blocks having suitable formations formed therein.

Figure 5:
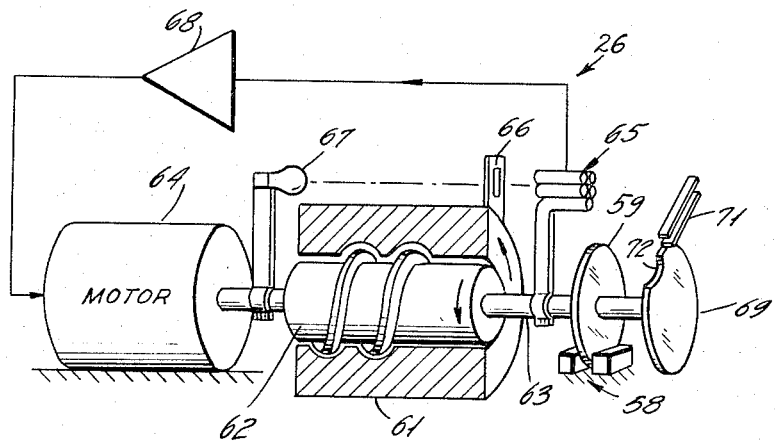
FIGURE 5 is a functional schematic of an attitude stabilizing loop.

Rotating helix double integrating accelerometer is of the type illustrated in detail in the copending application Ser. No. 212,888 filed July 27, 1962, now U.S. Patent No. 3,229,529, entitled Rotating Helix Double Integrating Accelerometer with Nai-Chong Chang as inventor and assigned to the assignee of the instant invention. Now refer to the functional schematic of accelerometer 26 (FIGURE 5) for a brief description hereof. Accelerometer 26 includes sensing element 61 mounted for rotation guided by the helical thread of screw 62 mounted to the output shaft 63 of servo motor 64. Rotation of sensing element 61 relative to screw 62 is detected by photo-diode assembly 65 by virtue of the fact that the apertured shield 66 carried by sensing element 61 will permit light from lamp 67 impinging upon assembly 65 to create an unbalanced condition. This condition brings about the generation of a signal fed through amplifier 68 to operate motor 64 in a direction such that output shaft screw 62 is returned to a null position with respect to sensing element 61. The rotation of screw 62 to this null position is indicative of altitude and causes rotation of cam 69 carried by motor output shaft 63. Also mounted to output shaft 63 is the conductive disc 59 of eddy ecurrent torquer 58 which provides bias to compensate for earth's gravity.

Cam 69 is in engagement with arm 71 which operates switch S–3 (FIGURE 6) in the safing circuit. Switch S–3 is normally open and is operated to closed position only when cam 69 is so positioned that arm 71 is disposed within cam notch 72.

One of the significant advantages of a rotating helix double integrating accelerometer, and of particular importance in the operation of an altimeter, is its very low cross coupling (sensitivity to acceleration components normal to the measuring axis). This is in contrast to a conventional double integrating accelerometer in which a very tight servo is required to achieve low cross coupling. On the other hand, in a helix type accelerometer the cross coupling error is insensitive to servo error. Thus, the servo may be of simple construction and is not critical.

In inertial altimeter 10, helix accelerometer 26 is constructed with hydrostatic gas bearing means as illustrated in one of the embodiments in the aforesaid application 212,888. The use of gas bearing means has the advantage of superior quick start characteristics and the ability to perform under adverse environmental conditions.

In inertial altimeter 10 attitude stabilization is achieved by developing torque without the convenience of reacting against external mass. As best seen in the functional schematic of FIGURE 4, the X axis attitude stabilization loop means 80 includes single axis non-gyroscopic attitude sensing inertia wheel 43 maintained in operative position by gas bearing means 81. A gas operated piston means (not shown) is provided for clamping the wheel prior to its activation. Wheel 43 carries an apertured shield 82 which is interposed between light source 83 and photo-diode assembly 84. In the desired position of wheel 43 the net output from assembly 84 is zero. However, any relative rotation of wheel 43 about the X axis causes photo-diode assembly 84 to generate an error signal which is fed through the stabilization and control circuits of amplifier 85 to operate torque motor 42 in the proper direction. Operation of torque motor 42 causes rotation of reaction wheel 41 which develops a reaction torque in the desired direction on sphere 23, 24 since reaction wheel 41 is accelerating in a direction opposite to the desired torque. As will hereinafter be explained, the utilization of a non-gyroscopic attitude stabilizer is made possible by the automatic drift compensation technique incorporated in the operation of inertial altimeter 10.

Since the attitude stabilization means for the Y and Z axes are identical to and operate in substantially the same manner as the attitude stabilization means 80 illustrated in FIGURE 4, no additional description thereof will be given.

Figure 3:
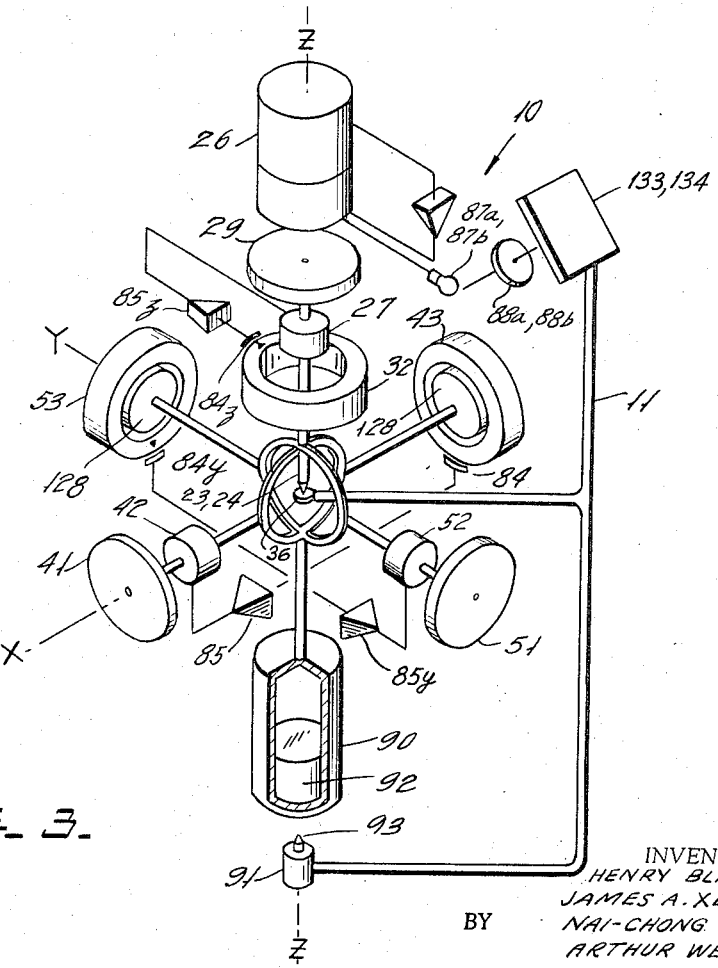
FIGURE 3 is a functional schematic of the altitude sensor of FIGURE 1.

The operation of inertial altimeter 10 is most readily understood by referring to FIGURES 3, 6 and 7. In order to simplify the pictorial schematic of inertial altimeter 10 contained in FIGURE 3, the gas bearing means that supports the floated sphere assembly has been replaced by a pivot 36 at the center of support of the sphere assembly. Further, reference numerals 85y and 85z have been assigned to the Y and Z axis servo amplifiers, respectively, and reference numerals 84y and 84z to their respective associated error signal pick-offs.

Rotating helix double integrating accelerometer 26, disposed within sphere 23, 24, controls safing signal lamps 87a, 87b so positioned within shell 23, 24 that the rays thereof project through transparent portions 88a, 88b, respectively of shell 23, 24 and impinge upon photo pick-off means 133, 134 carried by external sphere 11. Also disposed within sphere 23, 24 of inertial altimeter 10 are three similar attitude stabilization means (FIGURE 4) each associated with a respective one of the X, Y and Z axes and each comprising a single axis non-gyroscopic inertial wheel, and an inertial reaction wheel, both positioned along its associated axis, and a control amplifier. A retractable unbalanced mass assembly 90 positioned along the Z axis is also disposed within sphere 23, 24. A damping solenoid 91 carried by frame 11, as will be hereinafter explained is operable into engagement with shell 23, 24.

The following sequence of events occurs during normal operation of inertial altimeter 10. These events are indicated as a function of time in FIGURE 7 and are described briefly as items 1 through 10 below.

(1) *Initiation.*—During storage, shell 23, 24 is caged as are the stabilizers disposed therein. Electrical contact with shell 23, 24 is made by means of probes which engage contact extending through insulating areas of shell 23, 24. To activate inertial altimeter 10 electrical power is applied to the input terminals.

(2) *Spherical gas bearing pressurized.*—When the input terminals are energized squib 105 on frame 11 is fired thereby releasing pressurized gas from supply 109 to hydrostatic gas bearing pads 19 to float shell 23, 24.

(3) *Thermal battery activated.*—When the input terminals are energized squib 108 within shell 23, 24 is fired thereby activating the internal thermal battery 110 in shell 23, 24 to provide power to the electronic circuits within shell 23, 24.

(4) *Sphere uncaged.*—After spherical bearing pads 19 are pressurized and the internal thermal battery is activated, shell 23, 24 is uncaged, and the electrical probes which initiated the sequence of events within shell 23, 24 are removed.

(5) *Vertical alignment initiated.*—As soon as shell 23, 24 is uncaged it begins to oscillate about the vertical because of the fact that unbalancing mass 92 of vertical alignment assembly 90 is in its low position. In this position of unbalance mass 92, the center of gravity of the floated assembly 25 is below the center of support for shell 23, 24. At quarter cycle intervals, alignment damping solenoid 91 is operated and projects friction pad 93 to make momentary contact with the outer surface of shell 23, 24 thereby damping the oscillations thereof.

(6) *Sphere spinup.*—When the Z axis of sphere 23, 24 has had a predetermined time to settle in line with the local vertical, signal is applied to rotate Z reaction wheel 29 for a fixed period of time. When this signal is removed, shell 23, 24 has some nominal angular velocity about the local vertical.

(7) *Internal gas supply activated.*—When shell 23, 24 has been spun-up squib 122 within shell 23, 24 is fired, and the internal gas bearing components are pressurized from supply 125.

(8) *All sensors uncaged.*—After activation of the internal gas supply 125, all attitude stabilizers are uncaged, and the servo loops are energized.

(9) *Unbalance mass retracted.*—After all servo loops have had a predetermined time following the delayed firing of squib 122 to get into normal operation, shell 23, 24 becomes balanced with respect to its center of support by retraction of unbalance mass 92. That is, unbalance mass 92 is moved upward along the Z axis to a position such that the center of gravity of floated sphere assembly 25 coincides with the center of support for floated sphere assembly 25.

(10) *System operational.*—After retraction of unbalance mass 92 the system becomes and remains operational.

The sequence of operations referred to in paragraphs 1 through 9 above will now be described in greater detail.

On the block diagram of FIGURE 6 the double set of solid lines 101, 102 indicates the boundary between the support structure 11 and the stabilized sphere assembly 25. In support structure 11 countdown is initiated at T-1 by closing switch S-1 connecting inertial altimeter 10 to an external power source. This applies power directly to squib 105 and to main power probe 106 as well as to delay unit D-1 connected in series between main power solenoid 107 and the external power source. At T-1 the external power source is also connected to squib 108 through power probe 106. After a very slight delay, at T-2, squibs 105 and 108 fire. The firing of squib 105 connects external pressurized gas supply 109 to spherical air bearing pads 19 while the firing of squib 108 connects the internal thermal battery 110 within shell 23, 24 to all of the electronic units within shell 23, 24 and also to delay units D-2 and D-3 within shell 23, 24. The combined delay from unit D-1 and the natural time constant of main power solenoid 107 are sufficient to assure that main power probe 106 is not withdrawn before internal power squib 108 is fired.

Firing of squib 105 causes shell 23, 24 to be floated. With vertical alignment mass 92 (FIGURE 3) in its lower position the center of gravity of sphere assembly 25 is positioned below its center of support so that shell 23, 24 swings in a pendulous oscillation about the local vertical. Operation of main power solenoid 107 causes the arm 111 of switch S-2 to engage switch contact 112 at T-5 thereby applying power through G-1 to the vertical alignment damping solenoid 91 in series with normally closed switch 115. Since switch 115 is opened by actuation of solenoid plunger 116, solenoid 91 will be alternately activated and deactivated so that plunger 116 will oscillate at a natural frequency. Each time solenoid 91 is activated friction pad 93 carried by plunger 116 momentarily engages the external surface of shell 23, 24 with this contact acting as a brake to momentarily halt the pendulous motion of shell 23, 24. It is obvious to those skilled in the art that if the natural frequency of solenoid 91 is made to be four times the natural frequency of the pendulous sphere then sphere motion will quickly be damped to a small amplitude oscillation about the local vertical. The number of operations required of damping solenoid 91 is a quantity determined experimentally. However, by the time the selected required number of operations of damping solenoid 91 have occurred, the time delayed opening of gate G-1 will take place to de-energize damping solenoid 91.

Within shell 23, 24 delay unit D-2 is set to assure that the measuring axis Z of accelerometer 26 has been aligned with the local vertical prior to transmission of a voltage pulse to Z torque motor 27 through gate G-2 and Z amplifier 85z. Operation of motor 27 rotates torque wheel 29 causing shell 23, 24 to rotate about the Z axis. Since none of the sensing elements within shell 23, 24 has as yet been floated, both the sensing elements and shell 23, 24 will rotate at the same speed when the sensing elements are uncaged so that the sensing accuracy of these devices will not be affected by rotation of shell 23, 24.

At the conclusion of the torque voltage pulse fed through gate G-2, squib 122 for internal air supply 125 is energized through delay unit D-3. When squib 122 fires, internal supply 125 furnishes air or other gas under pressure to all of the sensing wheels and to accelerometer 26 and also moves vertical alignment unbalance mass 92 upwardly along the Z axis to a point where it is engaged by latch 126, and sphere assembly 25 is balanced. It is noted that gas supplies 109 and 125 are regulated such that a much higher pressure is supplied to all bearings during the initial period of missile flight, when acceleration forces are greatest, and then reduced for the remainder of the flight. This is done to reduce turbine torque, especially on the inertia wheels, thereby reducing drift error.

The release of air from internal supply 125, by supplying air to the X, Y and Z attitude stabilizing means pushes out the inertia wheel caging pistons (not shown) and floats the sensors. Since assembly 25 is now floated and balanced, and the attitude stabilization means are now in normal operation, any torques about the X, Y and Z axes will result in relative motion between one or more of the floated inertial wheels and its associated photoelectric pickoff rigidly fixed to shell 23, 24, and will cause an error signal to be applied to the stabilizing networks of the control amplifier in question, with the output of the amplifier being applied to the torque motor, which drives the torque wheel in a direction such that an opposing torque is generated so that shell 23, 24 is restored to proper attitude (its attitude condition at release).

At this point in time spherical assembly 25 is floated with the measuring axis Z aligned with the local vertical and all unbalanced torques are compensated for by the respective attitude stabilization means so that inertial altimeter 10 is aligned and in operation.

Since the measuring axis of double integrating accelerometer 26 is aligned with the local vertical the torque applied by accelerometer motor 64 is the equal of and opposite to that caused by the earth's gravity field. Since accelerometer sensing element 61 acts as a nut and output element 62 acts as a screw thread, accelerations along the Z axis cause the sensing element 61 to rotate with respect to output element 62. This relative rotation is detected by photodiode pickoffs 65 which supply a proportional DC error signal to the stabilizing circuits forming part of amplifier 68. The output of amplifier 68 drives motor 64 and hence output element 62 in a direction such that the error signal is reduced to zero. The net result is that output element 61 is driven at an angular acceleration proportional to the vertical acceleration of the missile. Therefore, the total angle rotated by output element 61 is the double integral of the angular acceleration which means it is proportional to the vertical distance traveled by the missile.

When the motor shaft 63 has rotated through an angle that is equivalent to the safing altitude, cam 69 (FIGURE 5) is positioned with member 71 in cam depression 72. In this position member 71 acts to close switch S–3 thereby connecting safing lamps 87a and 87b to thermal battery 110. Each of the lamps 87a, 87b will illuminate half of the area between shell 23, 24 and support structure 11. The interior surface of the support structure is coated with a photo-resistive material 133, 134 so that when lamps 87a and 87b are lighted the impedance of the photo-resistive layer 133, 134 will be reduced to the extent that enough current will flow into the safing switch 135 to turn switch 135 on.

The ON condition of safing switch 135 generates a "safing signal" to arm the missile. Should the missile altitude go above or below the safing range member 71 will be moved out of cam depression 72 and switch S–3 will be opened so that the missile will be disarmed.

Inertial altimeter 10 is constructed in a manner such that complete self-testing may be accomplished on the ground. This testing would check that all mechanical operations have occurred, that all bearing surfaces are floated, that all servos are operating and that the signal lights and photosensing circuits are operating. Operation of the torque servos and inertia wheels and sphere rotation is checked by applying a pulse torque about each axis and measuring the resultant pickoff output. Double integrating accelerometer 26 is tested by measuring its rotation over a given period of time when subjected to say a 1G field. Retraction of unbalancing mass 92 must occur to initiate the entire cycle. Operation of each of the foregoing functions will set up a "1" level at the input of a multi-input "and" gate. Only when all levels are at the "1" level and the "and" gate is energized is a light pulse transmitted to the photo-sensors. This light pulse may be used to generate a signal indicating that the system is operative.

It can be shown mathematically that, in the absence of any special compensation the largest source of error in any inertial altimeter is caused by misalignment of the accelerator measuring axis resulting from drift in the attitude sensors. In inertial altimeter 10 the rotation imparted to floated sphere 25 prior to uncaging of the attitude sensors automatically compensates for attitude sensor drift rate. The use of the reaction wheel to spin the floated sphere prior to floating of the attitude sensors does not introduce any net angular momentum that would influence the motion of the floated sphere. This is true because the angular momentum of the reaction wheel about the accelerometer measuring axis is equal and opposite to the angular momentum of the rest of the floated sphere about the accelerometer measuring axis. In a practical embodiment, floated sphere rotation to compensate for misalignment between the accelerometer measuring axis and the local vertical takes place at a frequency of approximately 1 cycle per second. Assuming there is no error in initial alignment, effect of this rotation is to cause the accelerometer measuring axis to rotate about the local vertical in a manner so as to generate a double cone whose apices are positioned at the center of support for the sphere. The trace of the measuring axis on a unit sphere will look like a spiral starting from a point on the local vertical. This causes the misalignment due to drift in the attitude stabilizers to change sign at the rotational frequency of the sphere. As a result, the altitude error due to misalignment is effectively canceled on alternate half cycles of rotation.

Thus, this invention provides a novel construction for an inertial altimeter which, because of its relative simplicity of construction, is an extremely reliable unit. Specific features which improve its reliability are the gas bearing suspension for the sphere and attitude stabilizers which eliminates the gimbals or slip rings in a conventional platform; the double integrating feature of the accelerometer which eliminates the need for external computers; and the non-gyroscopic attitude stabilizers which eliminate the motor and bearing in a gyroscopic attitude sensor.

It is noted that the inertial altimeter of the instant invention may readily be checked out prior to the launching. Further, the altimeter of the instant invention is substantially insensitive to radiation because of the use of gas bearing components rather than liquid suspensions as used in conventional inertial components. Gas bearings are unaffected by a radiation environment whereas liquids used in inertial components have been known to decompose in this environment.

In order to permit all-attitude operation of altimeter 10, no physical contact exists between the floated sphere and the vehicle base during normal operation of the altimeter. All necessary power within the floated sphere is provided by self contained thermo batteries since the floated sphere is supported by a spherical hydrostatic gas bearing means, and reaction torquers are utilized for attitude stabilization. Height measurement performance is not limited by parisitic torques on the stabilized member due to effects such as turbine torque in the gas bearings, residual unbalance in the sphere assembly, and asymmetries in the bearing gap.

In the form previously described, the stabilized sphere is used to maintain an accurate vertical orientation, and the output information received from the sphere is a function of vertical distance traveled. However, it can be seen that the sphere is inherently capable of being stabilized about any axis in inertial space. Therefore, it will be a logical extension of the present system to develop a complete stable platform using the torquer stabilized sphere principle. To do this, the three axis torquer inertial sensor portion of the sphere would remain essentially unchanged and the following additional equipment would be added to the system:

(1) Two additional accelerometers, mutually perpendicular to each other and also to the present vertical accelerometer, would be added to the system.

(2) A multiplex data link system would be added between the inner and outer spheres to transmit the three axis acceleration data between the sphere and the external computer.

(3) Either a discrete binary point or a three axis optical incremental encoder system would be included between the inner and outer spheres to enable rotations of the vehicle to be measured.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A device of the class described including a support structure; an assembly; means mounting said assembly to said support structure for universal movement relative thereto about a center of support through which first, second, and third mutually perpendicular axes extend; said assembly including first, second, and third rotation rate stabilization means individual to said first axis, said second axis and said third axis, respectively; said assembly also including an accelerometer having a measuring axis mounted along one of said axes; additional means for spinning said assembly relative to said support structure about said one of said axes prior to launching of said device and to maintain said spin while said support structure is in motion; and further means for initiating operation of the rotation rate stabilization means for said one axis subsequent to actuation of said additional means.

2. A device as set forth in claim 1 in which each of said stabilization means is non-gyroscopic and includes a single axis sensing element, means for generating an error signal responsive to rotation of said element relative to said assembly about said single axis, a servo motor energized in response to said error signal and a reaction mass driven by said servo motor to cause a restoring force in a direction opposite to movement of said reaction mass to be exerted upon said assembly.

3. A device as set forth in claim 1 in which the accelerometer is a rotating helix double integrating unit.

4. A device as set forth in claim 1 in which the means mounting the assembly to the support structure physically does so in floating relationship; said assembly including radiation generating means actuated in response to a predetermined output of said accelerometer; and radiation-sensitive means on said support positioned to be acted upon by rays emanating from said radiation generating means upon actuation thereof.

5. A device as set forth in claim 4 in which said accelerometer and each of said stabilization means include a sensing element and air bearing means floatingly mounting said elements.

6. A device as set forth in claim 5 in which said assembly includes a spherical shell wherein said first, second and third stabilization means and said accelerometer are mounted; said means mounting said assembly to said support structure comprising spherical air bearing means.

7. A device as set forth in claim 1 also including a mass mounted at one of said axes for aligning this last recited axis with the local vertical; means guiding movement of said mass between a first and a second position; said assembly having its center of gravity coinciding with said center of support when said mass is in said first position; said assembly having its center of gravity positioned below said center of support when said mass is in said second position whereby said assembly oscillates with a pendulum like motion until said last recited axis is aligned with the local vertical.

8. A device as set forth in claim 7 also including damping means carried by said support structure, means for intermittently operating said damping means into engagement with said assembly a predetermined number of times to damp the pendulum-like motion of said assembly thereby decreasing the time required to align the axis with the local vertical.

9. A device as set forth in claim 8 in which the damping means includes a solenoid coil, an energiizng means for said coil, a switch in circuit between said coil and said energizing means, an element operated by said solenoid when energized into engagement with said assembly and an operative connection between said coil and said switch whereby energization of said coil is effective to open said switch thereby interrupting the circuit between said coil and said energizing means.

10. A device of the class described including a support structure; an assembly; means mounting said assembly to said support structure for universal movement relative thereto about a center of support through which first, second, and third mutually perpendicular axes extend; said assembly including first, second, and third non-gyroscopic attitude stabilization means individual to said first axis, said second axis and said third axis, respectively; each of said stabilization means including a single axis sensing element, means for generating an error signal responsive to movement of said element about said single axis, a servo motor energized in response to said error signal and a reaction mass driven by said servo motor to cause a restoring force in a direction opposite to movement of said reaction mass to be exerted upon said assembly; said assembly also including an accelerometer having a measuring axis mounted along one of said axes; said assembly further including a spherical shell wherein said first, second and third stabilization means as well as said accelerometer are mounted; said assembly also including additional means for aligning one of said axes with the local vertical; said additional means including a mass, means guiding movement of said mass along the last recited of said axes between a first and a second position, said assembly having its center of gravity coinciding with said center of support when said mass is in said first position; said assembly having its center of gravity positioned below said center of support when said mass is in said second position whereby said assembly oscillates with a pendulum-like motion until the last recited of said axes is aligned with the local vertical; damping means carried by said support structure, means for intermittently operating said damping means into engagement with said assembly a predetermined number of times to damp the pendulum-like motion of said assembly thereby decreasing the time required to align the last recited of said axes with the local vertical.

11. A device as set forth in claim 10 in which the damping means includes a solenoid coil, an energizing means for said coil, a switch in circuit between said coil and said energizing means, an element operated by said solenoid when energized into engagement with said assembly and an operative connection between said coil and said switch whereby energization of said coil is effective to open said switch thereby interrupting the circuit between said coil and said energizing means.

References Cited

UNITED STATES PATENTS

| | | | |
|---|---|---|---|
| 1,501,886 | 7/1924 | Abott | 74—5 |
| 1,998,948 | 4/1935 | Wittkuhns et al. | 33—226 |
| 2,129,818 | 9/1938 | Carter | 33—226.4 |
| 2,252,338 | 8/1941 | Alkan. | |
| 2,567,053 | 9/1951 | Catravas | 33—220 X |
| 2,930,138 | 3/1960 | La Coste | 33—220 |
| 2,933,267 | 4/1960 | Slater et al. | |
| 2,948,157 | 8/1960 | Sedgfield. | |
| 3,027,117 | 3/1962 | Hall et al. | 244—14 |
| 3,050,995 | 8/1962 | Dozier | 33—226 X |
| 3,005,352 | 10/1961 | Claret | 74—5.34 |
| 3,088,324 | 5/1963 | Strang et al. | 73—505 |
| 3,129,592 | 4/1964 | Bracutt | 73—490 |
| 3,148,547 | 9/1964 | Angele | 73—490 |
| 3,212,340 | 10/1965 | Benckert | 73—490 |
| 3,229,529 | 1/1966 | Chang | 73—490 |
| 3,235,204 | 2/1966 | Lee | 244—1 X |

FOREIGN PATENTS

| | | |
|---|---|---|
| 408,936 | 4/1934 | Great Britain. |

ROBERT B. HULL, *Primary Examiner.*